Dec. 23, 1941.  J. W. HALE  2,267,650
COUPLING DEVICE
Filed July 9, 1938
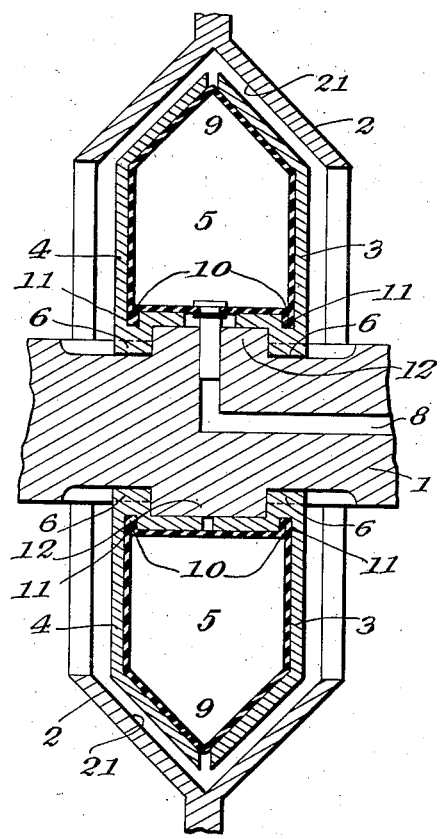
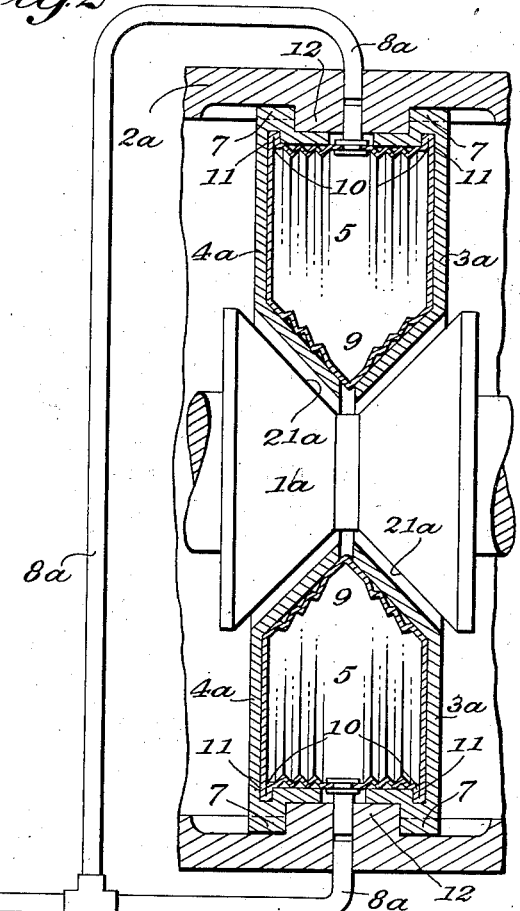
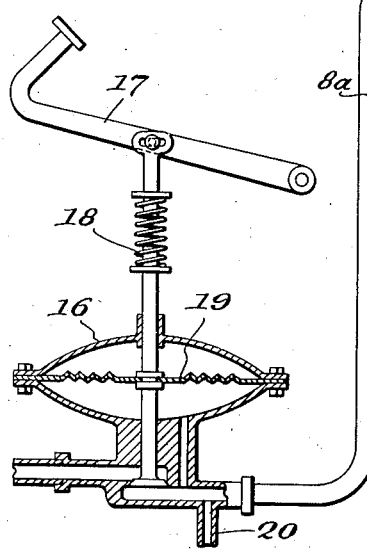
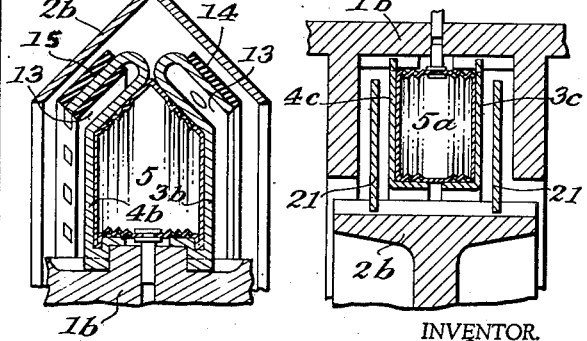
INVENTOR.
Jesse W. Hale
BY Spear Rawlings & Spear
ATTORNEYS.

Patented Dec. 23, 1941

2,267,650

UNITED STATES PATENT OFFICE 2,267,650

COUPLING DEVICE

Jesse W. Hale, Newton Center, Mass.

Application July 9, 1938, Serial No. 218,439

11 Claims. (Cl. 192—88)

My present invention relates to a novel coupling for use as a brake, clutch or the like.

My invention utilizes, in the connection of a pair of members, an expansible coupling carried by one of the members to engage with engageable surfaces on or carried by the other member. The expansible coupling includes a pressure operable member enclosed by movable casing parts which establish coupling surfaces which may be angularly disposed to effect a wedging action if desired. This construction is simple in construction and durable in use since the casing establishes protection for its pressure operable member.

Other features and advantages of my invention will be apparent from the accompanying specification and drawing.

In the drawing:

Fig. 1 is a fragmentary view in cross section of an embodiment of my invention in which the actuating pressure is delivered axially through the inner member.

Fig. 2 is a similar view of a modified form of my invention in which the actuating pressure is delivered through the outer member under the control of an operator actuated pressure regulating valve.

Fig. 3 is a fragmentary view of a further modification of my invention, and

Fig. 4 is a fragmentary view of another modification of my invention.

In Fig. 1 I have indicated the members to be coupled at 1 and 2, and at 1ᵃ and 2ᵃ in Fig. 2 and at 1ᵇ and 2ᵇ in Fig. 3. The members to be coupled may be taken as representative of any brake or clutch structure.

In Fig. 1, I have shown the casing parts 3 and 4 for the pressure operable member 5 slidably splined as at 6 to the member 1. In Fig. 2, the casing parts 3ᵃ and 4ᵃ are slidably splined as at 7 to the member 2ᵃ. This difference in construction is necessary since in the form of my invention shown in Fig. 1 it may be assumed that the member 1 is stationary and may be formed with a conduit 8 in communication with a suitable source of pressure (not shown) and that the member 2 is rotatable and cannot be utilized to carry the fluid under pressure. In Fig. 2, the reverse situation is presented in that the member 2ᵃ may be provided with the conduit 8ᵃ.

The pressure operable member 5 may be of any desired construction and of any suitable expansible material such as corrugated metal, rubber, artificial rubber, or the like.

The member 5 may be formed with a wedge shaped portion 9 as shown in Figs. 1, 2 and 3, and a pair of rim portions 10 and the casing parts 3, 4, 3ᵃ and 4ᵃ are shaped to established on assembly, a casing of similar section with base portions having key portions to establish the splines. Preferably the base portions of the casing parts include pockets 11 to receive the rim portions 10 of the expansible pressure operable member 5. The splines 6, 6 and 7, 7 are preferably separated as at 12 to establish a centering stop for the casing parts, 3, 4, 3ᵃ and 4ᵃ. Because the member 5 is locked to the casing parts through the rims 10 and the pockets 11, release of pressure in the member 5 results in movement of the casing parts.

In Fig. 1, the member 2 is formed with a recess 21 to receive the wedge shaped portions of the casing for the member 5. In Fig. 2, the member 1ᵃ is formed with a recess 21ᵃ.

In Fig. 3, I have shown the casing parts 3ᵇ and 4ᵇ as including the portions 13 formed to establish on assembly a wedge shaped portion sufficiently spaced from the member 5 to establish an air space for cooling. This construction also permits the portions 13 to be resilient.

The portions 13 may carry a riveted lining 14 or may carry molded lining indicated at 15.

In the embodiment of my invention shown in Fig. 4, the casing parts 3ᶜ and 4ᶜ for the expansible member 5ᵃ are slidably splined to the member 1ᵇ to engage with clutch plates 21 slidably splined to the member 2ᵇ.

The operation of my device will be readily apparent since when pressure is admitted to the expansible member 5 the casing parts are actuated to engage with the other member to be coupled as shown in Figs. 1, 2 and 3 to effect engagement of parts 3ᶜ and 4ᶜ with the clutch plates 21 as shown in Fig. 4.

The full advantages of my novel coupling may be appreciated if the pressure to the member 5 is properly controlled whether my coupling is to be used as a brake or as a clutch.

In Fig. 2, I have shown a pressure regulating valve 16 in control of the conduits 8ᵃ. At 17, I have indicated an operator control which through the compressible member 18 actuates the valve 16. The valve 16 is also under the control of a diaphragm or like pressure operable member 19. At 20, I have shown a bleeder conduit to return fluid to the source such as a crank case (not shown) from which the fluid is delivered under pressure to the expansible member. The diaphragm 19 is subject to the pressures of the fluid admitted through the valve. The bleeder line 20 permits the fluid pressure to be relieved when the valve is closed.

Thus, in operation, actuation of the control 17 results in a positioning of the valve to admit a predetermined pressure to the member 5 and on an excess of pressure the valve 16 closes.

What I therefore claim and desire to secure by Letters Patent is:

1. In a coupling device, a first member, a second member, means to couple said members, said means comprising a rimmed pressure operable expansible member, a casing for said expansible member, said casing comprising a pair of sections, each of said sections including base and key portions, said base portions being recessed to receive the rims of said expansible member, said first member having key ways to receive said key portions, said key ways being spaced to establish a centering stop for said sections when moved by the contraction of said expansible member, and said second member including portions engageable by said sections on expansion of said expansible member.

2. In a coupling device, a first member, a second member, means to couple said members, said means comprising a rimmed pressure operable expansible member, a casing for said expansible member, said casing comprising a pair of sections, each of said sections including base and key portions, said base portions being recessed to receive the rims of said expansible member, said first member having key ways to receive said key portions, said key ways being spaced to establish a centering stop for said sections when moved by the contraction of said expansible member, and said second member including portions engageable by said sections on expansion of said expansible member, and operator controlled means to deliver pressure to said expansible member.

3. The device of claim 1 in which the engageable portions are slidably splined to said first member.

4. The device of claim 1 in which the casing sections include angularly disposed portions to render said coupling means an expansible wedge, and the engageable portions define a wedge-shaped recess for said expansible wedge.

5. The device of claim 1 in which the casing sections and the expansible member include angularly disposed portions to render said coupling means an expansible wedge and the engageable portions define a wedge-shaped recess for said expansible wedge.

6. The device of claim 1 in which the casing includes resilient portions angularly disposed to render said coupling means an expansible wedge.

7. In a coupling device, a first member, a second member, means to couple said members, said means comprising a casing comprising a pair of sections, said sections and said first member having engageable portions, each of said sections including key portions, said second member having keyways to slidably receive the key portions of each of said sections, stop means on said second member to center said sections with said engageable portions of said sections and said first member out of engagement, and a pressure operable expansible member of resilient stock between said sections to slide said sections to effect engagement of said engageable portions, said expansible member and said sections being formed with complemental interlocking portions whereby the inherent resilience of said expansible member is effective to carry said sections positively against said stop means.

8. Coupling means comprising a first member, a second member including a pair of walls disposed to establish a V-shaped recess, a casing comprising a pair of sections slidably splined to said first member, said sections having side walls and end walls inclined to establish a wedge entrant of said V-shaped recess engageable with but normally spaced from the walls of said second member establishing said recess, a pressure operable member within and attached to said sections normally holding said wedge out of engagement with said walls defining said recess, said expansible member having side walls and tapered end walls entrant of said wedge establishing walls of said sections, and means whereby fluid under pressure is admitted to said expansible member to slide said sections to carry said wedge establishing walls of said sections into engagement with the walls of said second member defining said recess.

9. The coupling means of claim 8, the side walls of the expansible member being fixed to the side walls of said sections adjacent the first member to ensure the proper return of the sections to their normal position when the pressure in said expansible member is released.

10. The coupling means of claim 8, the inclined walls of said sections defining said wedge comprising inwardly and upwardly inclined portions for contact by the expansible member and outwardly and downwardly inclined portions spaced from said first portions for engagement with the walls of said second member establishing said V-shaped recess.

11. The coupling means of claim 7, there being a source of fluid, means to deliver fluid under pressure from said source to the expansible member and operator controlled valve means to regulate the pressure of the delivered fluid definitely to effect desired engagement of said engageable portions.

JESSE W. HALE.